United States Patent
Chung et al.

(10) Patent No.: US 8,737,819 B2
(45) Date of Patent: May 27, 2014

(54) ELECTRONIC DEVICE AND MEDIA CONTENTS REPRODUCING METHOD THEREOF

(71) Applicant: LG Electronics Inc., Seoul (KR)

(72) Inventors: Beobki Chung, Seoul (KR); Wonsik Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/685,395

(22) Filed: Nov. 26, 2012

(65) Prior Publication Data

US 2013/0177290 A1 Jul. 11, 2013

(30) Foreign Application Priority Data

Jan. 11, 2012 (KR) .................... 10-2012-0003551

(51) Int. Cl.
*H04N 5/928* (2006.01)
(52) U.S. Cl.
USPC .......................................... 386/338; 386/353
(58) Field of Classification Search
CPC ................... H04N 21/4305; H04N 21/4307
USPC ..................... 386/200, 338, 343, 345, 355
See application file for complete search history.

(56) References Cited

U.S. PATENT DOCUMENTS 6,148,136 A * 11/2000 Tanaka et al. ................. 386/232
6,658,197 B1 * 12/2003 Shimura ....................... 386/221

* cited by examiner

*Primary Examiner* — Huy T Nguyen
(74) *Attorney, Agent, or Firm* — Birch, Stewart, Kolasch & Birch, LLP

(57) ABSTRACT

The present disclosure relates to an electronic device and a media contents reproducing method thereof. An electronic device according to an embodiment of the present disclosure may include a reproducing unit configured to reproduce media contents; and a controller configured to generate a control signal in response to an adjustment command for a reproduction speed of the media contents. The reproducing unit may include an audio parser configured to parse an audio stream of the media contents to detect its sampling rate; and an audio decoder configured to change an inverse sampling rate corresponding to the detected sampling rate according to the control signal, and decode the audio stream based on the changed inverse sampling rate.

14 Claims, 9 Drawing Sheets

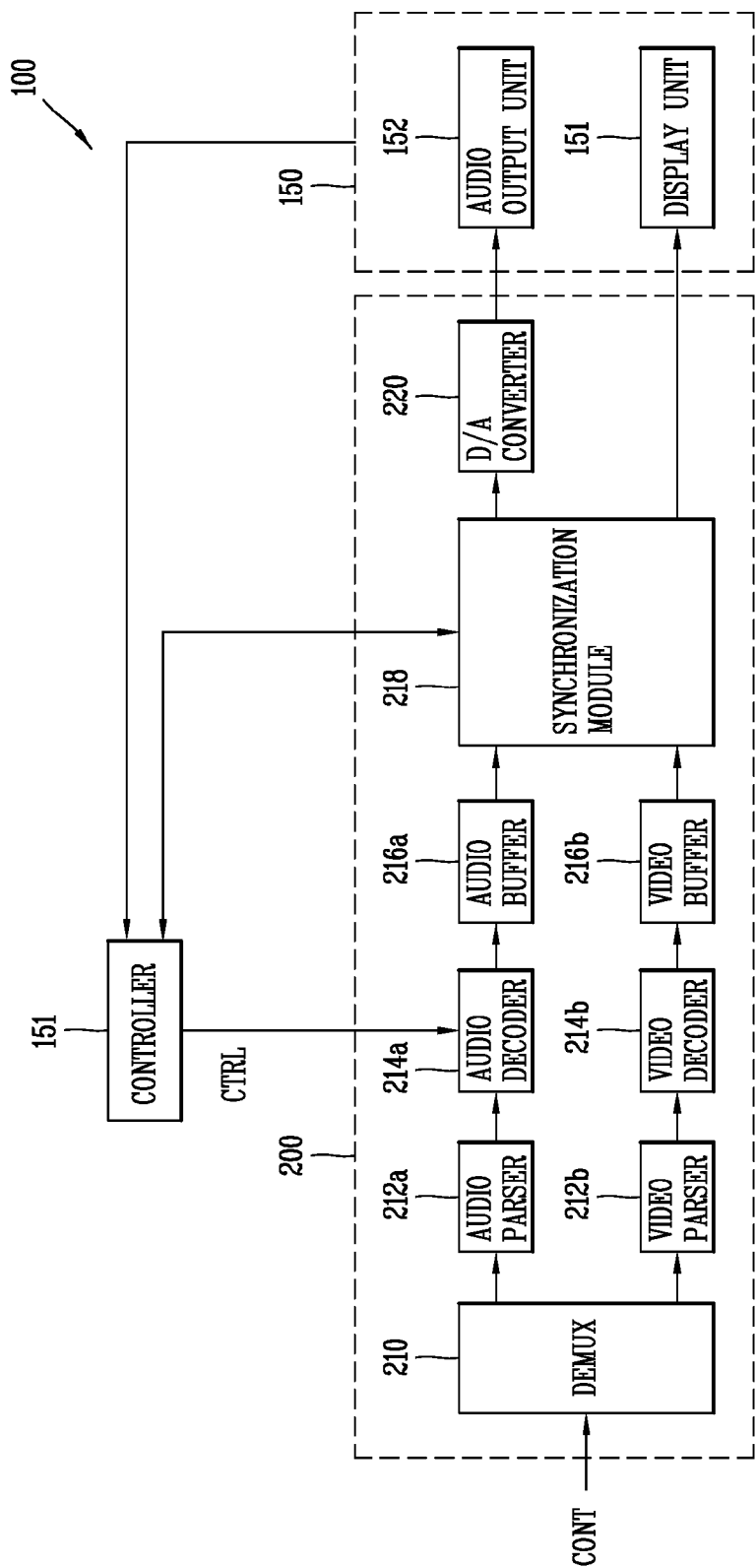

FIG. 6
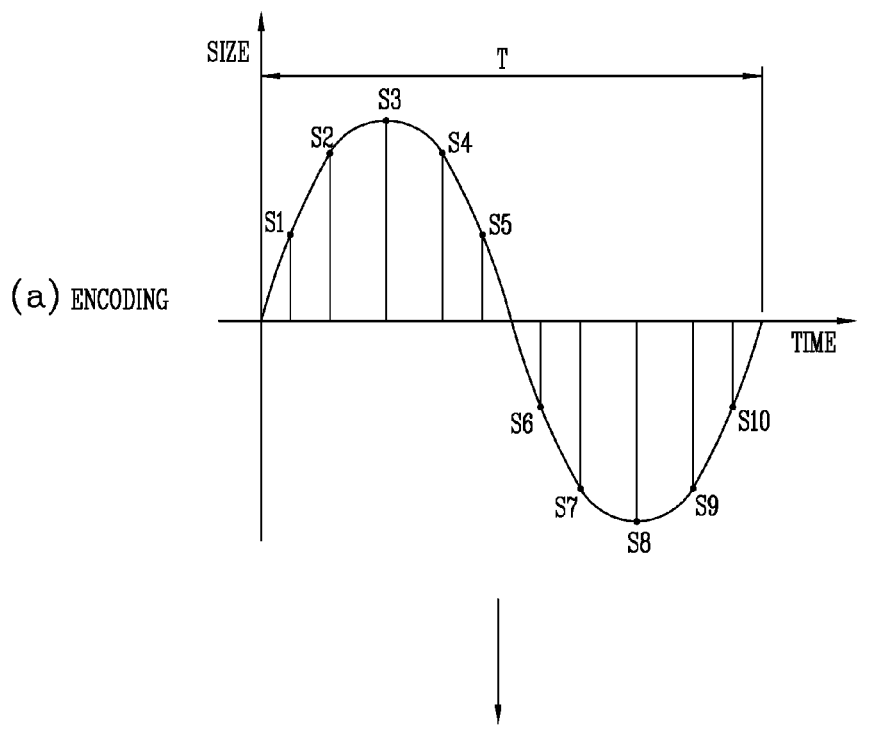
(a) ENCODING
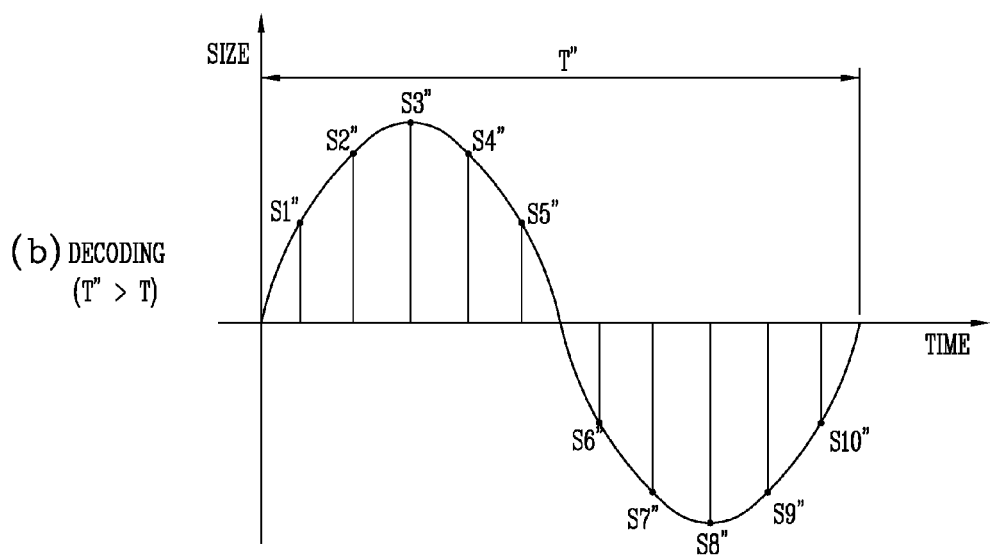
(b) DECODING
(T" > T)

ELECTRONIC DEVICE AND MEDIA CONTENTS REPRODUCING METHOD THEREOF

CROSS-REFERENCE TO RELATED APPLICATIONS

Pursuant to 35 U.S.C. §119(a), this application claims the benefit of earlier filing date and right of priority to Korean Application No. 10-2012-0003551, filed on Jan. 11, 2012, the contents of which is incorporated by reference herein in its entirety.

BACKGROUND OF THE INVENTION

1. Field of the Invention

The present disclosure relates to an electronic device, and more particularly, to an electronic device capable of reproducing media contents and a media contents reproducing method thereof.

2. Description of the Related Art

Electronic device is a device provided with various electronic elements to perform a voice and video communication function, an information input, output and storage function, and the like, such as TV, PC, notebook computer, portable terminal, and the like.

As the functions become diversified, the electronic device is implemented in the form of a multimedia player having complicated functions such as capturing still or moving images, playing music or video files, gaming, receiving broadcast, and the like. Moreover, the improvement of structural or software elements of the electronic device may be taken into consideration to support and enhance the functions of the electronic device.

Owing to the foregoing improvement, an electronic device may provide the function of controlling a reproduction speed during the reproduction of media contents. However, in order to control the reproduction speed of media contents using the conventional method, it may be required to have a complicated control for each functional block and undesirable noise may be generated.

SUMMARY OF THE INVENTION

An aspect of the present disclosure is to provide an electronic device and a media contents reproducing method thereof capable of efficiently and stably controlling a reproduction speed of media contents.

An electronic device according to an embodiment of the present disclosure may include a reproducing unit configured to reproduce media contents; and a controller configured to generate a control signal in response to an adjustment command for a reproduction speed of the media contents. The reproducing unit may include an audio parser configured to parse an audio stream of the media contents to detect its sampling rate; and an audio decoder configured to change an inverse sampling rate corresponding to the detected sampling rate according to the control signal, and decode the audio stream based on the changed inverse sampling rate.

According to an embodiment, the reproducing unit may further include a video decoder configured to decode a video stream of the media contents; and a synchronization module configured to synchronize the decoded video stream with the decoded audio stream.

According to an embodiment, the electronic device may further include a display unit configured to display a video image corresponding to the decoded video stream. The controller may recognize the adjustment command when the video image is enlarged or reduced. The audio decoder may decrease an inverse sampling rate corresponding to the detected sampling rate when the video image is enlarged, and increase an inverse sampling rate corresponding to the detected sampling rate when the video image is reduced.

According to an embodiment, the controller may control the display unit to enlarge or reduce the video image based on a touch input applied to the display unit. Furthermore, the controller may control the display unit to display reproduction speed information during the reproduction of the media contents.

According to an embodiment, the reproducing unit may further include an audio buffer configured to buffer the decoded audio stream being output from the audio decoder and transfer it to the synchronization module; and a video buffer configured to buffer the decoded video stream being output from the video decoder and transfer it to the synchronization module. A buffering timing of the decoded video stream may be controlled according to a buffering timing of the decoded audio stream.

According to an embodiment, the reproducing unit may further include a digital to analog converter (DAC) configured to convert the decoded audio stream being output from the synchronization module into an audio signal in an analog form. The frequency of the audio signal may correspond to the changed inverse sampling rate.

According to an embodiment, the reproducing unit may further include a demultiplexer configured to demultiplex the media contents to output the audio stream and the video stream.

A media contents reproducing method of an electronic device according to an embodiment of the present disclosure may include parsing an audio stream of the media contents to detect its sampling rate during the reproduction of media contents; generating a control signal in response to an adjustment command for a reproduction speed of the media contents; changing an inverse sampling rate corresponding to the detected sampling rate according to the control signal; and decoding the audio stream based on the changed inverse sampling rate.

According to an embodiment, the media contents reproduction method may further include decoding a video stream of the media contents; and synchronizing the decoded video stream with the decoded audio stream.

According to an embodiment, the media contents reproduction method may further include displaying a video image corresponding to the decoded video stream; and recognizing the adjustment command when the video image is enlarged or reduced.

According to an embodiment, said changing the inverse sampling rate may decrease the inverse sampling rate when the video image is enlarged, and increase the inverse sampling rate when the video image is reduced.

According to an embodiment, the media contents reproduction method may further include buffering the decoded audio stream and the decoded video stream, respectively. Furthermore, a buffering timing of the decoded video stream may be controlled according to a buffering timing of the decoded audio stream.

According to an embodiment, the media contents reproduction method may further include converting the decoded audio stream into an audio signal in an analog form. Furthermore, the frequency of the audio signal may correspond to the changed inverse sampling rate.

According to an embodiment, the media contents reproduction method may further include demultiplexing the media contents to output the audio stream and the video stream.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a block diagram illustrating an electronic device including a reproducing unit according to an embodiment of the present disclosure;

FIGS. 5 and 6 are conceptual views for comparing a sampling rate of the audio signal with an inverse sampling rate thereof according to the control method of FIG. 4;

DETAILED DESCRIPTION OF THE PREFERRED EMBODIMENT

Figure 1:
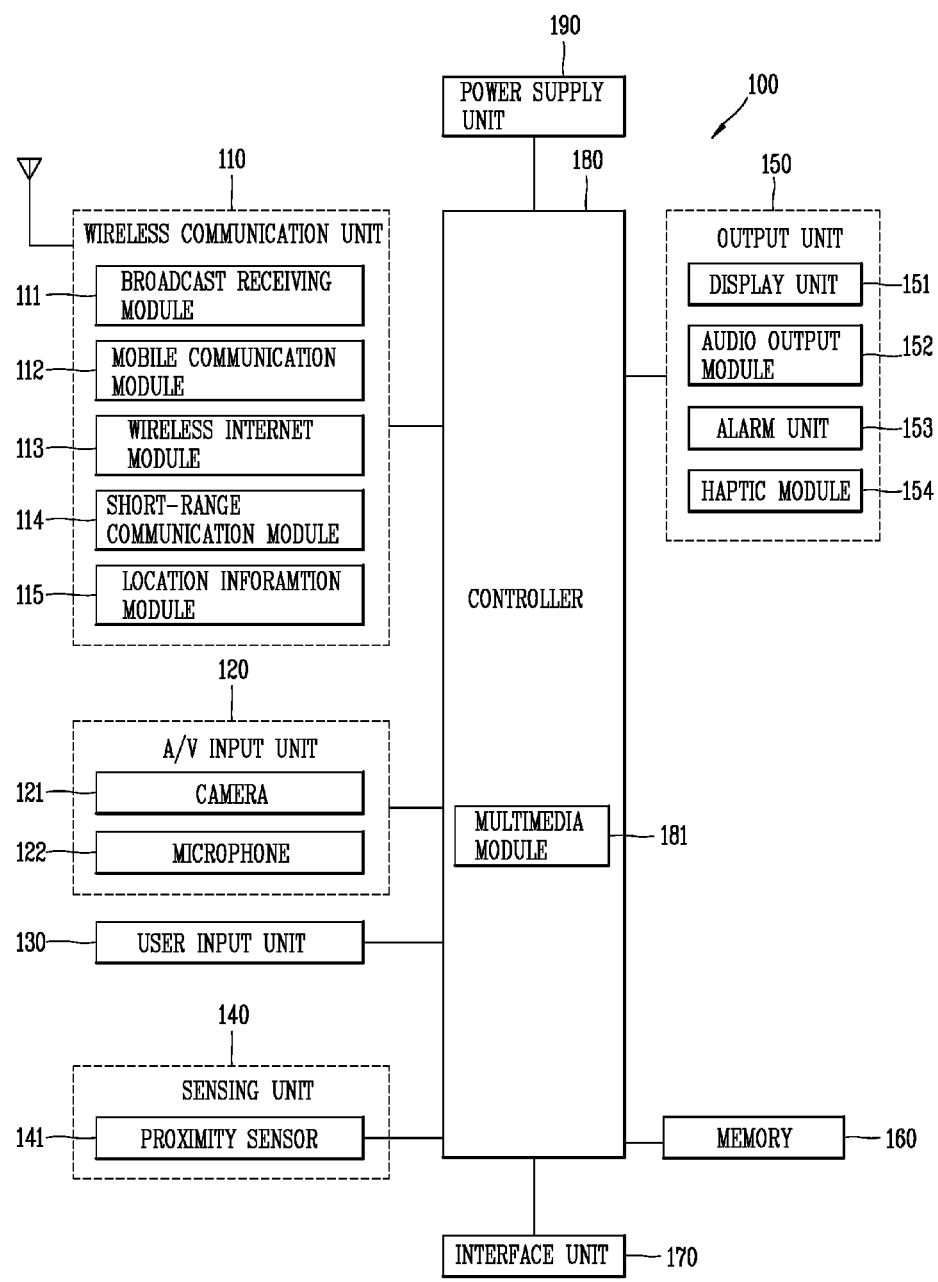
FIG. 1 is a block diagram illustrating an electronic device associated with the present disclosure.

Hereinafter, preferred embodiments of the present invention will be described in detail with reference to the accompanying drawings to such an extent that the present invention can be easily embodied by a person having ordinary skill in t he art to which the present invention pertains. However, the present invention may be implemented in various different forms, and therefore, the present invention is not limited to the illustrated embodiments. In order to clearly describe the present invention, parts not related to the description are omitted, and like reference numerals designate like constituent elements throughout the specification.

A mobile device disclosed herein may include a portable phone, a smart phone, a laptop computer, a digital broadcast mobile device, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating an electronic device 100 associated with an embodiment of the present invention. Referring to FIG. 1, the electronic device 100 may include a wireless communication unit 110, an audio/video (AN) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the electronic device may be implemented with greater or less number of elements than those illustrated elements.

Hereinafter, the constituent elements 110-190 of the electronic device 100 will be described in sequence.

The wireless communication unit 110 typically includes one or more elements allowing radio communication between the electronic device 100 and a wireless communication system, or allowing radio communication between radio communication the electronic device 100 and a network in which the electronic device 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the electronic device 100. Here, it may be used a wireless Internet technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the electronic device, and there is a global positioning system (GPS) module as a representative example.

Referring to FIG. 1, the A/V (audio/video) input unit 120 receives an audio or video signal, and the A/V (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the electronic device.

The microphone 122 receives an external audio signal through a microphone in a phone call mode, a recording mode, a voice recognition mode, and the like, and processes the audio signal into electrical voice data. The processed voice data processed by the microphone 122 may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a key pad, a dome switch, a touch pad (pressure/capacitance), a jog wheel, a jog switch, and the like.

The sensing unit 140 detects a current status of the electronic device 100 such as an opened or closed status of the electronic device 100, a location of the electronic device 100, an orientation of the electronic device 100, and the like, and generates a sensing signal for controlling the operation of the electronic device 100. For example, when the electronic device 100 is a slide phone type, it may sense an opened or closed status of the slide phone. Furthermore, the sensing unit 140 takes charge of a sensing function associated with whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When the display unit 151 and the touch sensor have a layered structure therebetween, the display unit 151 may be used as an input device rather than an output device. The display unit 151 may be referred to as a "touch screen".

When there is a touch input through the touch screen, the corresponding signals are sent to a touch controller (not shown). The touch controller processes the received signals, and then transmits data corresponding to the processed signals to the controller 180. Accordingly, the controller 180 may sense which region of the display unit 151 has been touched.

When the touch screen is implemented with a capacitance type, it may be configured such that the proximity of a detection subject is sensed by changes of an electromagnetic field. In this case, the touch screen may be categorized into a proximity sensor 141.

The proximity sensor 141 refers to a sensor to detect the presence or absence of a detection subject using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch".

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide an output associated with visual sense, auditory sense, tactile sense, and the like, and the output unit 150 may include the display unit 151, an audio output module 152, an alarm unit 153, a haptic module 154, and the like.

The display unit 151 may display (output) information processed in the electronic device 100. For example, when the electronic device 100 is in a phone call mode, the display unit 151 may display a User Interface (UI) or a Graphic User Interface (GUI) associated with a call. When the electronic device 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

At least one display (or display element) included in the display unit 151 may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the electronic device 100. For instance, a plurality of the display units 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the electronic device 100 (e.g., is sound alarming a call received or a message received, and so on). The audio output module 152 may include a receiver, a speaker, a buzzer, and so on.

The alarm 153 outputs signals notifying occurrence of events from the electronic device 100. The events occurring from the electronic device 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the electronic device 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the electronic device 100 may operate in association with a web storage which performs the storage function of the memory 160 on the Internet.

The interface unit 170 may generally be implemented to interface the portable terminal with external devices connected to the electronic device 100. The interface unit 170 may allow a data reception from an external device, a power delivery to each component in the electronic device 100, or a data transmission from the electronic device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the electronic device 100, is which may include a User Identity Module (UIM), a Subscriber Identity Module (SIM), and the like. Also, the device having the identification module (hereinafter, referred to as "identification device") may be implemented in a type of smart card. Hence, the identification device can be coupled to the electronic device 100 via a port.

Also, the interface unit 170 may serve as a path for power to be supplied from an external cradle to the electronic device 100 when the electronic device 100 is connected to the external cradle or as a path for transferring various command signals inputted from the cradle by a user to the electronic device 100. Such various command signals or power inputted from the cradle may operate as signals for recognizing that the electronic device 100 has accurately been mounted to the cradle.

The controller 180 typically controls the overall operations of the electronic device 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the electronic device 100 will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, or may be implemented in three-dimensional solid images. For an input of the visual information, at least one of the characters, numerals, symbols, graphics, or icons may be displayed with a predetermined arrangement so as to be implemented in a form of keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper portion and lower portion of the display unit, respectively. The output window and the input window may be regions allocated to output or input information, respectively. A soft key on which numerals for inputting phone numbers or the like are displayed is outputted on the input window. When the soft key is touched, numerals corresponding to the touched soft key are displayed on the output window. When the manipulating unit is manipulated, a call connection for the phone number displayed on the output window is attempted or a text displayed on the output window may be input to an application.

The display unit 151 or the touch pad may be configured to sense a touch scroll. The user may move an object displayed on the display unit 151, for example, a cursor or pointer placed on an icon, by scrolling the display unit 151 or the touch pad. Moreover, when a finger is moved on the display unit 151 or the touch pad, a path being moved by the finger may be visually displayed on the display unit 151. It may be useful to edit an image displayed on the display unit 151.

In order to cope with a case where the display unit 151 and the touch pad are touched together within a predetermined period of time, one function of the electronic device 100 may be executed. As a case of being touched together, there is a case when the user clamps a terminal body of the electronic device 100 is using the thumb and forefinger. For one of the functions executed in the electronic device 100, there may be an activation or de-activation for the display unit 151 or the touch pad.

Figure 2A:
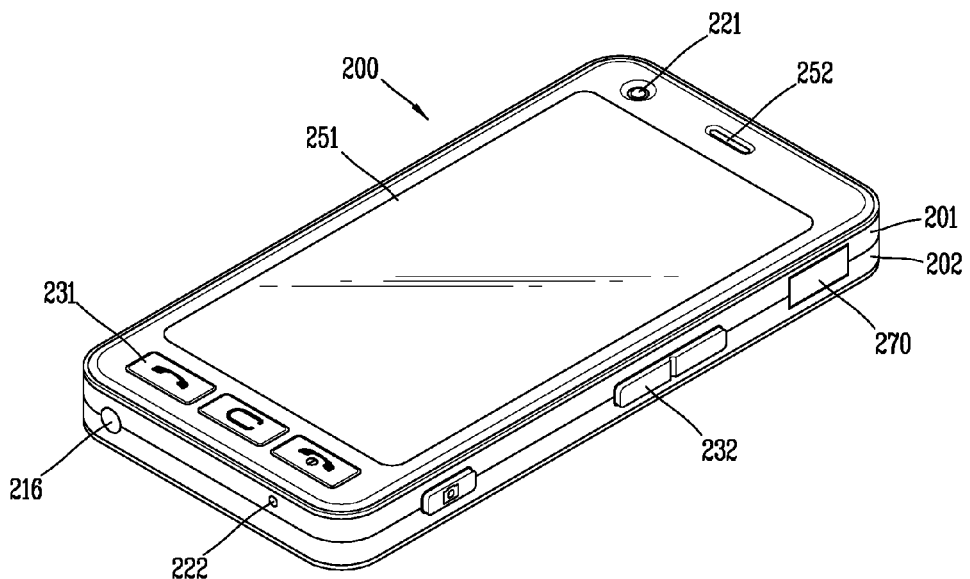
FIGS. 2A and 2B are perspective views illustrating an external appearance of an electronic device associated with the present disclosure.
Figure 2B:
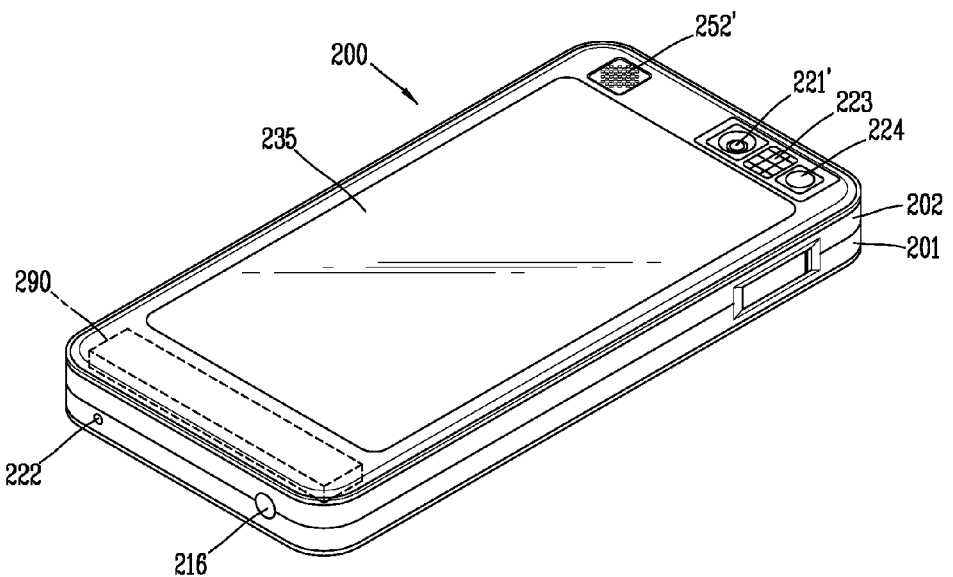

FIGS. 2A and 2B are perspective views illustrating the external appearance of an electronic device 100 associated with the present invention. FIG. 2A illustrates a front surface and one lateral surface of the electronic device 100, and FIG. 2B illustrates a rear surface and the other lateral surface of the electronic device 100.

Referring to FIG. 2A, the electronic device 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100. The user input unit 130 may include a plurality of manipulation units 131, 132.

A first or a second manipulating unit 131, 132 may receive various commands. The first manipulation unit 131 may be used to receive a command, such as start, end, scroll, or the like, and the second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface of the terminal body, namely, the rear case 102. The camera 121' has an image capturing direction, which is substantially opposite to the direction of the camera 121 (refer to FIG. 2A), and may have different pixels from those of the first video input unit 121.

For example, it is preferable that the camera 121 has a relatively small number of pixels enough not to cause a difficulty when the user captures his or her own face and sends it to the other party during a video call or the like, and the camera 121' has a relatively large number of pixels since the user often captures a general object that is not sent immediately.

Meanwhile, the cameras 121, 121' may be provided in the terminal body in a rotatable and popupable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call.

Furthermore, an antenna 116 for receiving broadcast signals may be additionally disposed on a lateral surface of the terminal body. The antenna 116 constituting a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151 (refer to FIG. 2A). Alternatively, a rear display unit for displaying visual information may be additionally mounted on the touch pad 135. At this time, information displayed on the both surfaces of the front display unit 151 and rear display unit may be controlled by the touch pad 135.

The touch pad 135 may be operated in conjunction with the display unit 151 of the front case 101. The touch pad 135 may be disposed in parallel at a rear is side of the display unit 151. The touch pad 135 may have the same size as or a smaller size than the display unit 151.

Hereinafter, according to an embodiment, an electronic device 100 capable of efficiently and stably controlling a reproduction speed of media contents. will be described in detail.

FIG. 3 is a block diagram illustrating the electronic device 100 including a reproducing unit 200 according to an embodiment of the present disclosure. Hereinafter, the description of a configuration same or similar to the foregoing configuration will be will be omitted.

Referring to FIG. 3, the electronic device 100 may further include a reproducing unit 200. The reproducing unit 200 may include a demultiplexer 210, an audio parser 212a, a video parser 212b, an audio decoder 214a, a video decoder 214b, an audio buffer 216a, a video buffer 216b, a synchronization module 218, and a digital-analog converter (DAC) 220.

The reproducing unit 200 may reproduce media contents (CONT) provided by the communication server or stored in the memory 160 (refer to FIG. 1). The media contents (CONT) may be referred to as multimedia contents or digital contents, which represent information in which text, image, video, audio and the like are produced, processed and distributed in a digital form.

According to an embodiment of the present disclosure, the media contents (CONT) may be implemented with a data bit stream in which the audio stream and video stream are mixed with each other. The audio stream and video stream may be encoded and decoded in various formats. For example, the audio stream may be encoded and decoded in the format of MP3, AAC, OGG, or the like. Furthermore, the video stream may be encoded and decoded in the format of MP4, is AVI, ASF, MPG, MOV, or the like.

The demultiplexer 210 may demultiplex media contents (CONT) received at the reproducing unit 200 to divide the audio stream and video stream, and output each stream. The audio parser 212*a* and video parser 212*b* parse the audio stream and video stream, respectively. Due to such parsing, meta data and reproducing data are separated from the audio stream and video stream, and the attribute information, synchronization information, and the like of each stream may be detected from the meta data. For example, the audio parser 212*a* may parse the audio stream to detect a sampling rate. In general, the sampling rate may be also referred to as a sampling frequency, which represents a value indicating how many number of samplings are carried out for each second to convert an analog signal into digital data.

The audio decoder 214*a* and video decoder 214*b* decode the audio stream and video stream, respectively. At this time, a decoding algorithm corresponding to each format of the audio stream and video stream may be used. The audio decoder 214*a* may change an inverse sampling rate corresponding to the detected sampling rate of the audio stream according to the control signal (CTRL). To this end, the controller 180 may recognize an adjustment command for a reproduction speed of the media contents (CONT), and generate a control signal (CTRL) in response to the command. The method of recognizing the adjustment command will be described below in detail with reference to FIGS. 7 through 9.

Furthermore, inverse sampling disclosed herein is an operation opposite to sampling in the aspect of encoding, which refers to the operation of reading samples from digital data to convert the digital data into an analog signal in the aspect of decoding, and an inverse sampling rate refers to a value indicating how many number of inverse samplings are carried out for each second.

The audio decoder 214*a* may decode an audio stream based on the changed inverse sampling rate of the audio stream. In this manner, changing an inverse sampling rate being referred to decode the audio stream denotes changing an interval between samples for changing the audio stream to an analog signal in the time domain. Accordingly, the reproduction speed of the audio stream can be controlled by changing the inverse sampling rate. It will be described below in more detail with reference to FIGS. 5 and 6.

The audio buffer 216*a* buffers the decoded audio stream being output from the audio decoder 214*a* to transfer it to the synchronization module 218, and video buffer 216*b* buffers the decoded video stream being output from the video decoder 214*b* to transfer it to the synchronization module 218. At this time, a buffering timing of the decoded video stream may be controlled according to a buffering timing of the decoded audio stream. Furthermore, a buffering size of the decoded video stream may be controlled according to a buffering size of the decoded audio stream.

The synchronization module 218 synchronizes the decoded video stream with the decoded audio stream. The synchronization module 218 may perform a synchronization operation using synchronization information obtained through parsing of each stream. Accordingly, when the reproduction speed of the audio stream is controlled, the reproduction speed of the video stream can be also controlled. For summary, an inverse sampling rate of the audio stream may be changed during the reproduction of media contents, and when a synchronization operation between the audio stream and video stream is carried out, the reproduction speed of the media contents may be changed.

The synchronization module 218 may synchronize the decoded video stream with the decoded audio stream in response to the control of the controller 180. At this time, the control of the controller 180 may follow the user's input. In other words, the synchronization between each stream may be automatically carried out according to a predetermined synchronization algorithm or manually carried out according to the user's input.

Furthermore, the synchronization module 218 may provide information indicating a synchronization state (hereinafter, referred to as "synchronization information") to the controller 180. The controller 180 may control the display unit 151 to display the synchronization information.

The digital-analog converter 220 converts the decoded audio stream being output from the synchronization module into an audio signal in an analog form, and provides it to the audio output unit 152, for example, speaker.

The display unit 151 displays a video image corresponding to the decoded video stream being output from the synchronization module 218. Furthermore, the display unit 151 may display a menu for controlling media contents, reproduction status information, and the like. The audio output unit 152 outputs an audio signal converted from the decoded audio stream.

As described above, according to the present disclosure, a reproduction speed of the media contents can be controlled by changing an inverse sampling rate corresponding to the sampling rate during the operation of decoding the audio stream. Such a change of the inverse sampling rate may be processed with a relatively simple operation, and scarcely cause an effect on the buffering operation and synchronization operation, thereby reducing the cost and effort required to implement a platform capable of controlling the reproduction speed of the media contents.

Furthermore, according to the present disclosure, buffering control for the audio stream may not be accompanied even when the reproduction speed is controlled during the reproduction of media contents, thereby preventing a periodical noise generation due to buffering control. As a result, it may be possible to control the reproduction speed in the state of maintaining the reproduction quality of media contents.

Figure 4:
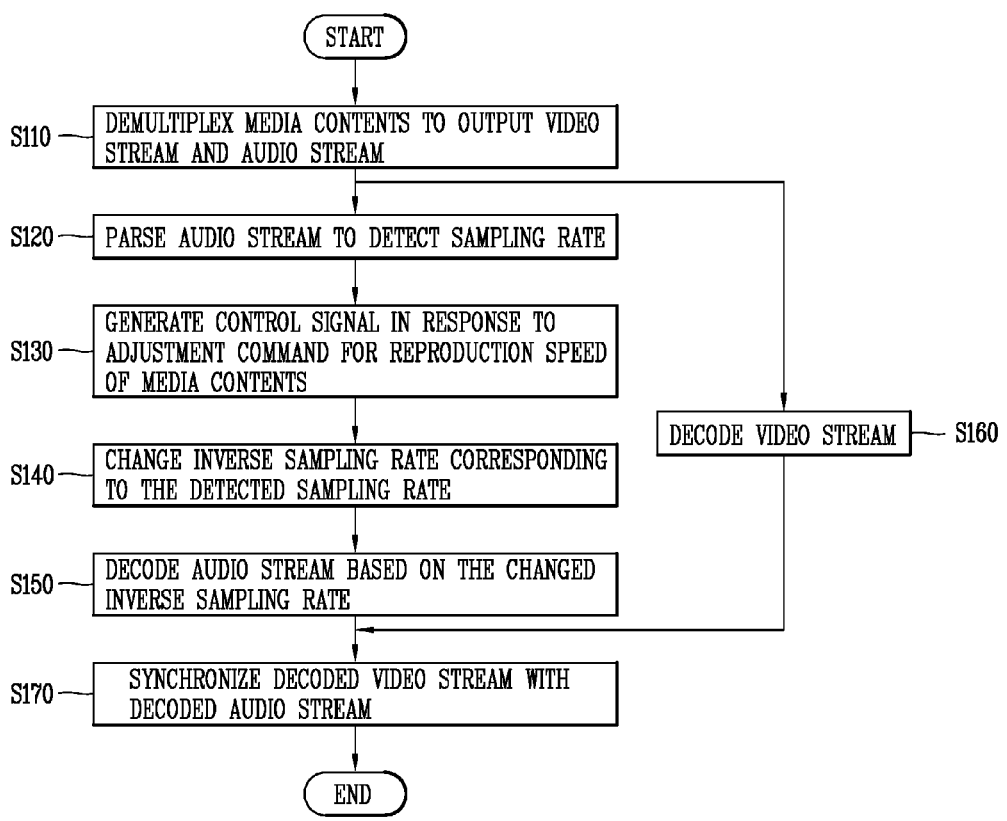
FIG. 4 is a flow chart for explaining a method of controlling an electronic device according to an embodiment of the present disclosure.

FIG. 4 is a flow chart for explaining a method of controlling the electronic device 100 according to an embodiment of the present disclosure. Referring to FIG. 4, first, the process of demultiplexing media contents during the reproduction of the media contents to output the audio stream and video stream (S110) is carried out. Next, the process of parsing the audio stream to detect its sampling rate (S120) is carried out.

Then, the process of generating a control signal in response to an adjustment command for the reproduction speed of the media contents (S130) and the process of changing an inverse sampling rate corresponding to the detected sampling rate of the audio stream based on the control signal (S140) are carried out. Then, the process of decoding the audio stream based on the changed inverse sampling rate of the audio stream (S150) is carried out. Accordingly, it may be possible to change a time of outputting an audio signal corresponding to the audio stream decoded in a predetermined unit, namely, audio reproduction speed, as described above.

On the other hand, when the video stream is output (S110), the process of decoding the video stream (S160) is carried out. To this end, parsing for the video stream may be first carried out using a similar method to the audio stream.

When the audio stream and video stream are decoded (S150, S160), the process of synchronizing the decoded video stream with the decoded audio stream (S170) is carried out. Accordingly, it may be possible to change a time of outputting a video image corresponding to the video stream decoded in a predetermined unit, namely, video reproduction speed, in synchronization with the audio reproduction speed as described above.

Figure 5:
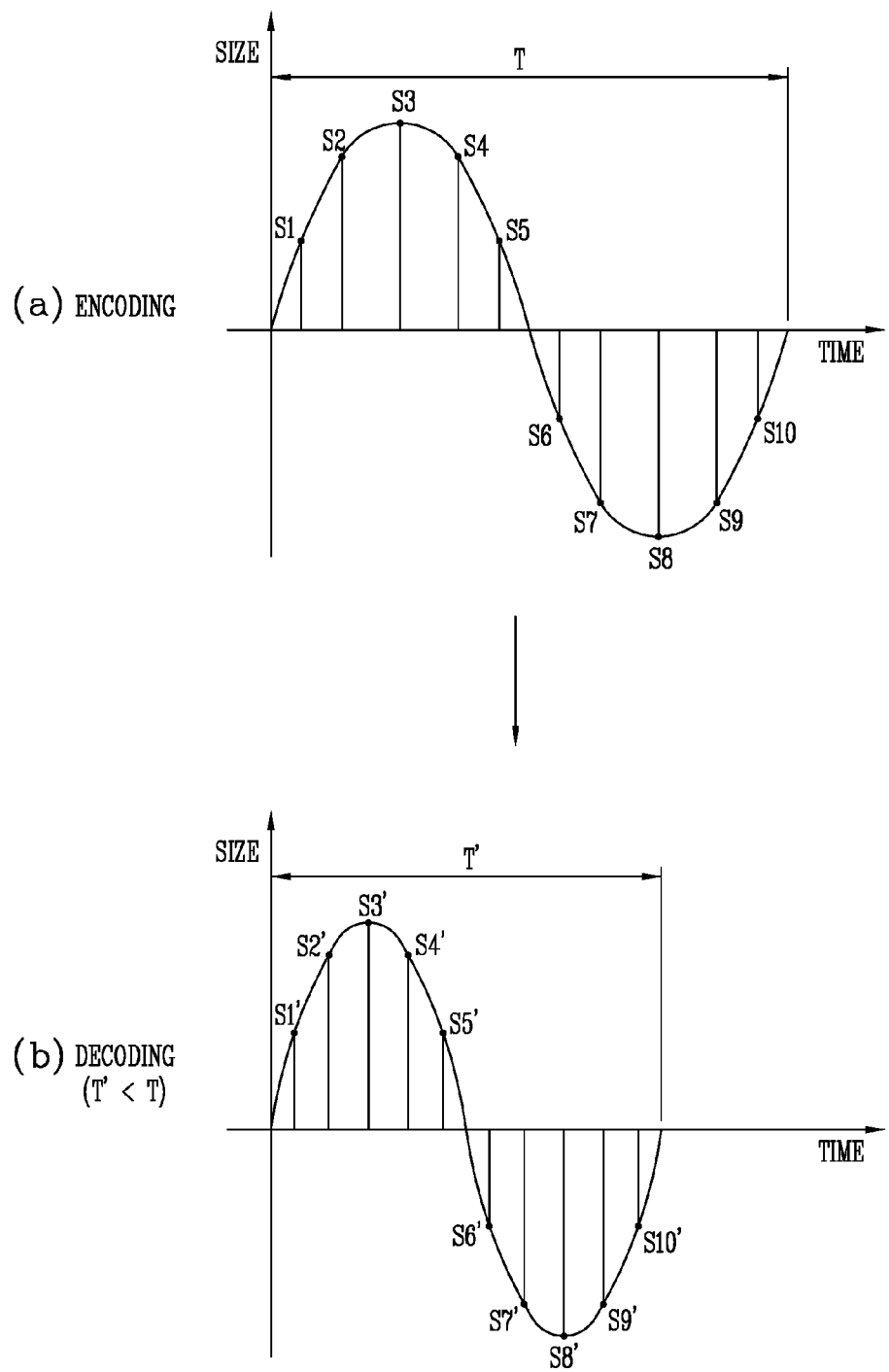

FIGS. 5 and 6 are conceptual views for comparing a sampling rate of the audio signal with an inverse sampling rate thereof according to the control method of FIG. 4. Referring to FIGS. 5 and 6, a plurality of samples (S1-S10) may be generated during a predetermined period (T) (hereinafter, referred to as a "reference period") while performing sampling for the audio signal. Then, as the quantization and noiseless coding process for the generated samples (S1-S10) is carried out, they may be converted into an encoded audio stream. At this time, the encoded audio stream may include a sampling rate corresponding to the reference period (T) and frequency.

Then, during the reproduction of media contents corresponding to the audio stream, an inverse sampling rate corresponding to the detected sampling rate may be changed as described above, and the encoded audio stream may be decoded based on the changed inverse sampling rate. As a result, the period of samples (S1'-S10' or S1"-S2") for converting the audio stream in a digital form into an audio signal in an analog form may be changed.

For example, when the audio stream is decoded based on an increased inverse sampling rate, an interval between samples (S1'-S10') restored in the time domain is decreased as illustrated in FIG. 5. It means that the audio signal converted from the audio stream has a smaller period (T') than the reference period (T) as well as the reproduction speed of the audio stream is increased. On the contrary, when the audio stream is decoded based on a reduced inverse sampling rate, an interval between samples (S1"-S10") restored in the time domain is increased as illustrated in FIG. 6. It means that the audio signal converted from the audio stream has a larger period (T") than the reference period (T) as well as the reproduction speed of the audio stream is decreased.

As described above, an inverse sampling rate changed during the operation of decoding the audio stream corresponds to the period and frequency of the audio signal converted from the audio stream, namely, the reproduction speed of the audio stream.

Figure 7:
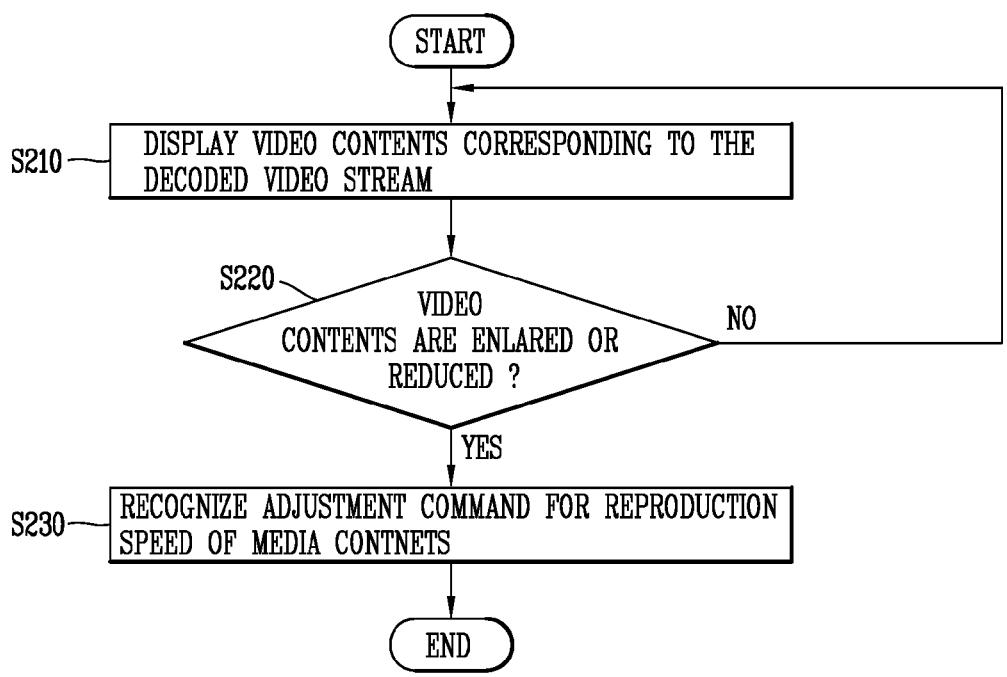
FIG. 7 is a flow chart for explaining a method of controlling an electronic device according to another embodiment of the present disclosure.

FIG. 7 is a flow chart for explaining a method of controlling the electronic device 100 according to another embodiment of the present disclosure. Referring to FIG. 7, first, the process of displaying a video image corresponding to the decoded video stream during the reproduction of media contents (S210) is carried out.

Then, the process of determining whether or not the video image is enlarged or reduced (S220) is carried out. Here, the video image may be enlarged or reduced in response to a touch input applied to the display unit 151 (refer to FIG. 3). For example, the video image may be enlarged or reduced in response to a pinch-in gesture input or pinch-out gesture input as a multi-touch input. In general, the pinch-in gesture denotes a gesture for which two fingers are widened while being brought into contact with the screen, and the pinch-out gesture as a gesture contrary to the pinch-in gesture denotes a gesture for which two fingers are narrowed while being brought into contact with the screen.

Furthermore, the video image may be enlarged or reduced in response to a touch input for the function button for controlling the screen of the display unit 151. The function button may be a software key button displayed on the screen of the display unit 151 or a hardware key button disposed at the terminal body.

Next, when the video image is enlarged or reduced, the process of recognizing an adjustment command for the reproduction speed of media contents (S230) is carried out. For example, an adjustment command for reducing the reproduction speed of media contents may be recognized when the video image is enlarged, and on the contrary, an adjustment command for increasing the reproduction speed of media contents may be recognized when the video image is reduced.

As described above, a control signal may be generated as the adjustment command is recognized, and an inverse sampling rate of the audio stream corresponding to the media contents may be changed based on the control signal. It means that an inverse sampling rate of the audio stream is changed as enlarging or reducing the video image during the reproduction of media contents, and as a result, the reproduction speed of the media contents can be controlled.

Figure 8:
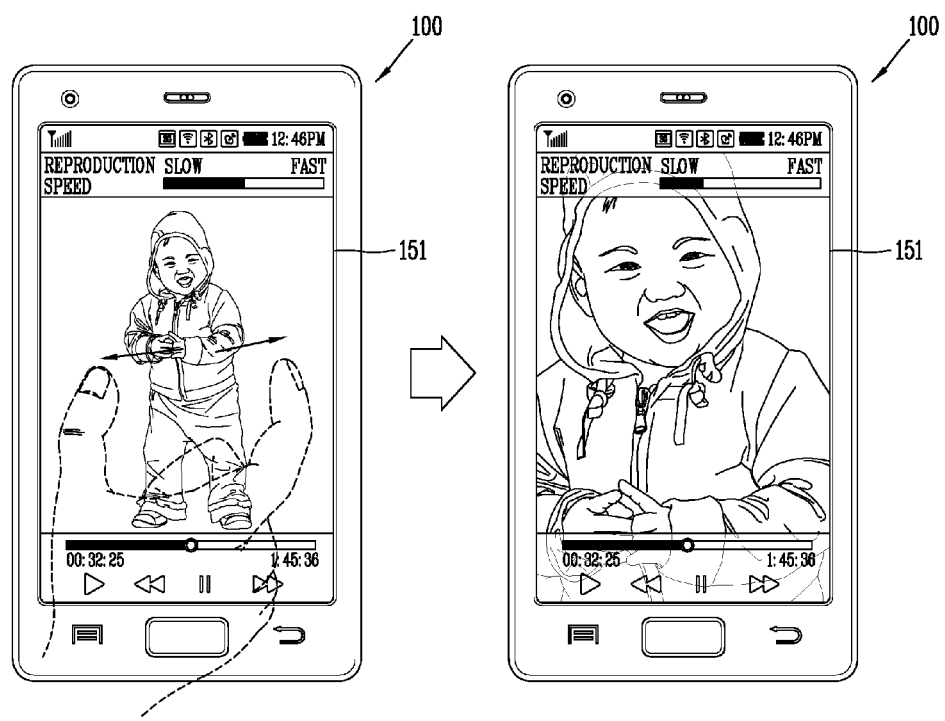
FIGS. 8 and 9 are conceptual views illustrating a user interface of an electronic device to which the control method of FIG. 7 is applied.
Figure 9:
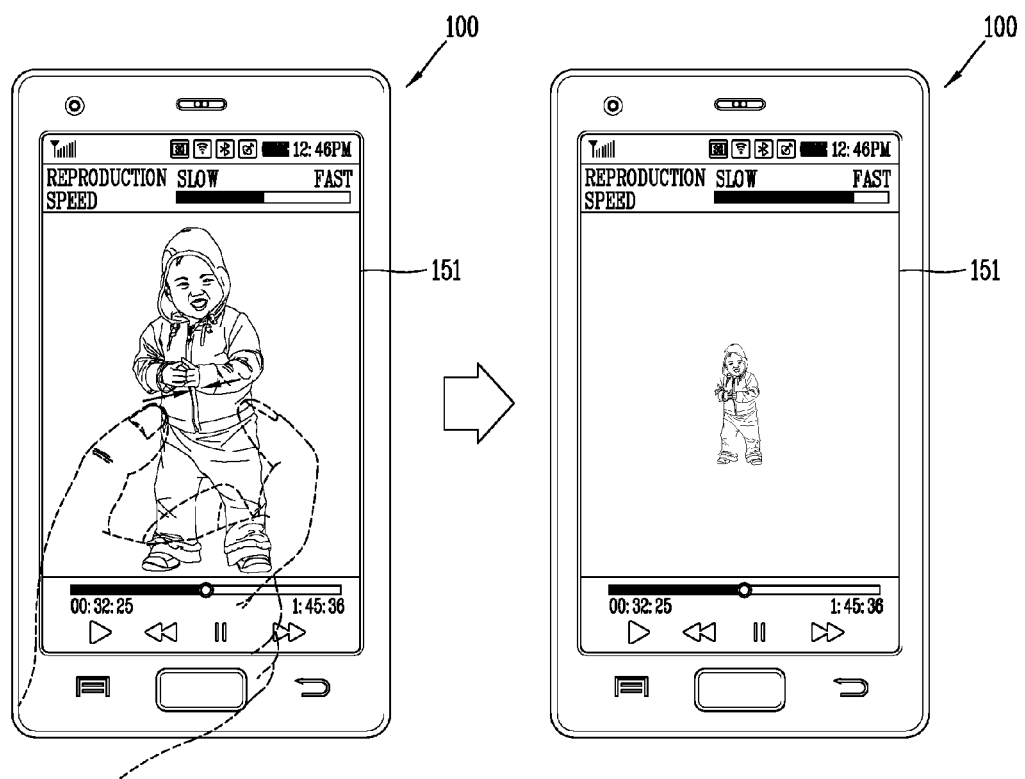

FIGS. 8 and 9 are conceptual views illustrating a user interface of the electronic device 100 to which the control method of FIG. 7 is applied. Referring to FIGS. 8 and 9, during the reproduction of media contents, the display unit 151 may display a video image corresponding to the decoded video stream. At this time, the display unit 151 may display reproduction status information such as reproduction speed, reproduction time, and the like.

According to an embodiment of the present disclosure, as illustrated in FIG. 8, when a pinch-in gesture input is sensed as a multi-touch input applied to the display unit 151, the controller 180 (refer to FIG. 3) may control the display unit 151 to enlarge the video image. Furthermore, when the video image is enlarged as described above, the controller 180 may recognize an adjustment command for reducing the reproduction speed of media contents to generate a control signal. Furthermore, the audio decoder 214a (refer to FIG. 3) may reduce an inverse sampling rate of the audio stream according to the control signal, and decode the audio stream based on the reduced inverse sampling rate of the audio stream.

On the contrary, as illustrated in FIG. 9, when a pinch-out gesture input is sensed as a multi-touch input applied to the display unit 151, the controller 180 may control the display unit 151 to reduce the video image. Furthermore, when the video image is reduced as described above, the controller 180 may recognize an adjustment command for increasing the reproduction speed of media contents to generate a control signal. Furthermore, the audio decoder 214a may increase an inverse sampling rate of the audio stream according to the control signal, and decode the audio stream based on the increased inverse sampling rate of the audio stream.

Subsequently, referring to FIGS. 8 and 9, the controller 180 may control the display unit 151 to display the reproduction speed of media contents updated according to a change of the inverse sampling rate of the audio stream as the reproduction status information while enlarging or reducing the video image.

According to an embodiment of the present invention, the foregoing method may be implemented as codes readable by a processor on a medium written by the program. Examples of the processor-readable media may include ROM, RAM, CD-ROM, magnetic tape, floppy disk, and optical data storage device, and the like, and also include a device implemented in the form of a carrier wave is (for example, transmission via the Internet).

The configurations and methods according to the above-described embodiments will not be applicable in a limited way to a mobile terminal disclosed herein, and all or part of each embodiment may be selectively combined and configured to make various modifications thereto.

What is claimed is:

1. An electronic device, comprising:
a reproducing unit configured to reproduce media contents, wherein the reproducing unit comprises:
an audio parser configured to parse an audio stream of the media contents to detect its sampling rate;
an audio decoder configured to decode the audio stream of the media contents;
a video decoder configured to decode a video stream of the media contents; and
a synchronization module configured to synchronize the decoded video stream with the decoded audio stream;
a display unit configured to display a video image corresponding to the decoded video stream; and
a controller configured to generate a control signal in response to an adjustment command for a reproduction speed of the media contents,
wherein the controller recognizes the adjustment command when the video image is enlarged or reduced, and
wherein the audio decoder is configured to change an inverse sampling rate corresponding to the detected sampling rate according to the control signal, and decode the audio stream based on the changed inverse sampling rate.

2. The electronic device of claim 1, wherein the audio decoder decreases an inverse sampling rate corresponding to the detected sampling rate when the video image is enlarged, and increases an inverse sampling rate corresponding to the detected sampling rate when the video image is reduced.

3. The electronic device of claim 1, wherein the controller controls the display unit to enlarge or reduce the video image based on a touch input applied to the display unit.

4. The electronic device of claim 1, wherein the controller controls the display unit to display reproduction speed information during the reproduction of the media contents.

5. The electronic device of claim 1, wherein the reproducing unit further comprises:
an audio buffer configured to buffer the decoded audio stream being output from the audio decoder and transfer it to the synchronization module; and
a video buffer configured to buffer the decoded video stream being output from the video decoder and transfer it to the synchronization module.

6. The electronic device of claim 5, wherein a buffering timing of the decoded video stream is controlled according to a buffering timing of the decoded audio stream.

7. The electronic device of claim 1, wherein the reproducing unit further comprises:
a digital to analog converter (DAC) configured to convert the decoded audio stream being output from the synchronization module into an audio signal in an analog form.

8. The electronic device of claim 7, wherein the frequency of the audio signal corresponds to the changed inverse sampling rate.

9. The electronic device of claim 1, wherein the reproducing unit further comprises:
a demultiplexer configured to demultiplex the media contents to output the audio stream and the video stream.

10. A media contents reproducing method of an electronic device, the method comprising:
parsing an audio stream of the media contents to detect its sampling rate during the reproduction of media contents;
decoding the audio stream and a video stream of the media contents;
displaying a video image corresponding to the decoded video stream;
generating a control signal in response to an adjustment command for a reproduction speed of the media contents, wherein the adjustment command is recognized when the video image is enlarged or reduced;
changing an inverse sampling rate corresponding to the detected sampling rate according to the control signal;
decoding the audio stream based on the changed inverse sampling rate; and
synchronizing the decoded video stream with the decoded audio stream.

11. The method of claim 10, wherein said changing the inverse sampling rate decreases the inverse sampling rate when the video image is enlarged, and increases the inverse sampling rate when the video image is reduced.

12. The method of claim 10, further comprising:
buffering the decoded audio stream and the decoded video stream, respectively,
wherein a buffering timing of the decoded video stream is controlled according to a buffering timing of the decoded audio stream.

13. The method of claim 10, further comprising:
converting the decoded audio stream into an audio signal in an analog form,
wherein the frequency of the audio signal corresponds to the changed inverse sampling rate.

14. The method of claim 10, further comprising:
demultiplexing the media contents to output the audio stream and the video stream.

* * * * *